(12) United States Patent
Lin

(10) Patent No.: US 11,850,542 B2
(45) Date of Patent: Dec. 26, 2023

(54) SWIRL AIR/LIQUID AIR PURIFIER

(71) Applicant: Chen-Hsin Lin, New Taipei (TW)

(72) Inventor: Chen-Hsin Lin, New Taipei (TW)

(73) Assignee: Chen-Hsin Lin, New Taipei (TW)

( * ) Notice: Subject to any disclaimer, the term of this patent is extended or adjusted under 35 U.S.C. 154(b) by 281 days.

(21) Appl. No.: 17/357,980

(22) Filed: Jun. 25, 2021

(65) Prior Publication Data

US 2022/0008861 A1 Jan. 13, 2022

(30) Foreign Application Priority Data

Jul. 10, 2020 (TW) .................................. 109208787

(51) Int. Cl.
| | |
|---|---|
| *B01D 47/00* | (2006.01) |
| *F24F 8/10* | (2021.01) |
| *B01D 47/02* | (2006.01) |
| *F24F 8/133* | (2021.01) |

(52) U.S. Cl.
CPC ......... *B01D 47/028* (2013.01); *B01D 47/024* (2013.01); *F24F 8/133* (2021.01); *B01D 2247/101* (2013.01); *B01D 2247/14* (2013.01); *B01D 2279/50* (2013.01)

(58) Field of Classification Search
CPC .... B01D 47/024; B01D 47/02; B01D 47/028; F24F 8/133; B01F 23/23
See application file for complete search history.

(56) References Cited

FOREIGN PATENT DOCUMENTS

| CN | 103961992 A | * | 8/2014 |
|---|---|---|---|
| CN | 105597459 A | * | 5/2016 |

* cited by examiner

*Primary Examiner* — Robert A Hopkins

(57) ABSTRACT

A swirl air/liquid air purifier comprises: a liquid accommodating disk, having a liquid accommodating space formed in a recessed status for accommodating a liquid; an air discharging pipe, disposed at a top end of the liquid accommodating disk and upwardly extended so as to be formed as a hollow body, wherein a bottom end thereof has a bottom base which is sealed at the top end of the liquid accommodating disk, the bottom base is formed with a plurality of air inlet holes arranged adjacent to a periphery of the air discharging pipe, one side of the air inlet hole is downwardly extended and obliquely inclined thereby forming an inclined guiding plate/pipe allowing a swirl airflow to be generated; and an air suction fan, disposed in the air discharging pipe.

8 Claims, 14 Drawing Sheets

SWIRL AIR/LIQUID AIR PURIFIER

BACKGROUND OF THE INVENTION

1. Field of the Invention

The present invention relates to an air purifier, especially to a swirl air/liquid air purifier, in which introduced flowing air enables a swirl liquid flow to be generated by a liquid accommodated in a liquid accommodating disk, with an absorbing force of the liquid for absorbing impurities such as dusts or liquid particles, the impurities such as the dusts or the liquid particles are able to be absorbed in the liquid, thereby achieving an objective of purifying the flowing air, and the fresh flowing air can be blown out through an air suction fan and an air discharging pipe.

2. Description of Related Art

With the development of the industrial and the commercial markets, various kinds of suspended micro particles and toxic substances are contained in the air, so that people may have different unhealthy factors accumulated through breathing or eating no matter in the working or the domestic environments, thereby seriously affecting the life quality; some skilled people in the art have invented air purifiers (air filtering and cleaning devices), but most of the conventional air purifiers (air filtering and cleaning devices) require an air filtering net as a consuming material, which is not environmental friendly and the structure thereof is complicated and labor consuming in assembly, moreover, the conventional air purifiers (air filtering and cleaning devices) are unable to be served as ornaments and unable to be externally provided with a plant for providing oxygen so as to be applied in various purposes, thus the practicability is very much limited and the shortages shall be seriously concerned and improved by the skilled people in the art.

SUMMARY OF THE INVENTION

For solving the shortages existed in the prior art, one primary objective of the present invention is to provide a swirl air/liquid air purifier, in which an air discharging pipe is disposed at a top end of a liquid accommodating disk and a bottom base is disposed at a bottom end of the air discharging pipe, the bottom base is formed with an air inlet hole and has an inclined guiding plate/pipe, and an air suction fan is disposed in the air discharging pipe, thereby overcoming the shortages existed in the prior arts.

Another objective of the present invention is to provide a swirl air/liquid air purifier, in which a bottom base formed with an air inlet hole and having an inclined guiding plate/pipe can enable a flowing air to generate a swirl airflow, so that a swirl liquid flow can be generated through a liquid accommodated in a liquid accommodating disk, and impurities such as dusts or liquid particles in the flowing air can be absorbed in the liquid, thereby achieving an objective of purifying air, then, the purified flowing air is able to be discharged through an air suction fan and an air discharging pipe so as to enter an opened space.

One another objective of the present invention is to provide a swirl air/liquid air purifier, which has advantages of effectively purifying air and having functions of being applied in various purposes.

Problems to be solved by the present invention are: with the development of the industrial and the commercial markets, various kinds of suspended micro particles and toxic substances are contained in the air, so that people may have different unhealthy factors accumulated through breathing or eating no matter in the working or the domestic environments, thereby seriously affecting the life quality; some skilled people in the art have invented air purifiers (air filtering and cleaning devices), but most of the conventional air purifiers (air filtering and cleaning devices) require an air filtering net as a consuming material, which is not environmental friendly and the structure thereof is complicated and labor consuming in assembly, moreover, the conventional air purifiers (air filtering and cleaning devices) are unable to be served as ornaments and unable to be externally provided with a plant for providing oxygen so as to be applied in various purposes, thus the practicability is very much limited.

For achieving the aforesaid objectives, one technical solution provided by the present invention is to provide a swirl air/liquid air purifier characterized in comprising:

a liquid accommodating disk, having a liquid accommodating space formed in a recessed status for accommodating a liquid;

an air discharging pipe, disposed at a top end of the liquid accommodating disk and upwardly extended so as to be formed as a hollow body, wherein a bottom end thereof has a bottom base which is sealed at the top end of the liquid accommodating disk, the bottom base is formed with a plurality of air inlet holes arranged adjacent to a periphery of the air discharging pipe, one side of the air inlet hole is downwardly extended and obliquely inclined thereby forming an inclined guiding plate/pipe allowing a swirl airflow to be generated; and an air suction fan, disposed in the air discharging pipe;

wherein, the air suction fan is utilized for sucking air, the air inlet hole having the inclined guiding plate/pipe and formed on the bottom base is utilized for introducing flowing air to generate a swirl airflow blowing towards a surface of the liquid or blowing into the liquid, so that a swirl liquid flow is able to be generated through the swirl airflow being applied to the liquid accommodated in the liquid accommodating disk due to frictions, and a surface tension of the liquid is broken for increasing a capability of the surface of the liquid absorbing impurities such as dusts or liquid particles in the flowing air, with the absorbing force of the liquid for absorbing the impurities such as the dusts or the liquid particles, the impurities such as the dusts or the liquid particles in the flowing air are able to be absorbed via the liquid accommodated in the liquid accommodating disk, then the purified flowing air is able to be discharged through the air suction fan and the air discharging pipe so as to enter an opened space, thereby achieving an objective of purifying the flowing air.

Wherein, according to the present invention, at least one filtering screen is disposed in the liquid accommodating space of the liquid accommodating disk.

Wherein, according to the present invention, the filtering screen is formed in a downwardly concave arc-shape.

Wherein, according to the present invention, at least one plant is disposed a location close to the hollow body upwardly extended from the air discharging pipe or at a location close to the air inlet hole of the air discharging pipe.

Wherein, according to the present invention, at least one ultraviolet device used for killing germs is disposed in the air discharging pipe.

Wherein, according to the present invention, a temperature controlling air chamber is disposed at a top end of the bottom base.

Wherein, according to the present invention, at least one temperature increasing/decreasing unit used for increasing/decreasing a temperature of the flowing air is disposed in the temperature controlling air chamber.

Wherein, according to the present invention, the temperature increasing/decreasing unit of the temperature controlling air chamber is a heating unit or a cooling unit.

Wherein, according to the present invention, an air conditioning device used for increasing/decreasing a temperature of the flowing air is externally connected to the temperature controlling air chamber.

Advantages achieved by the present invention comparing to the prior art are as follows. The air discharging pipe is disposed at the top end of the liquid accommodating disk and the bottom base is disposed at the bottom end of the air discharging pipe, the bottom base is formed with the air inlet hole and has the inclined guiding plate/pipe, and the air suction fan is disposed in the air discharging pipe; as such, the bottom base formed with the air inlet hole and having the inclined guiding plate/pipe can enable the flowing air to generate the swirl airflow, so that the swirl liquid flow can be generated through the liquid accommodated in the liquid accommodating disk, and the impurities such as the dusts or the liquid particles in the flowing air can be absorbed in the liquid, thereby achieving the objective of purifying air, then, the purified flowing air is able to be discharged through the air suction fan and the air discharging pipe so as to enter the opened space; accordingly, the present invention has advantages of effectively purifying air and having functions of being applied in various purposes; accordingly, the present invention is novel, more practical in use and capable of satisfying requirements of consumers comparing to prior arts.

BRIEF DESCRIPTION OF THE CODES

Figure 1:
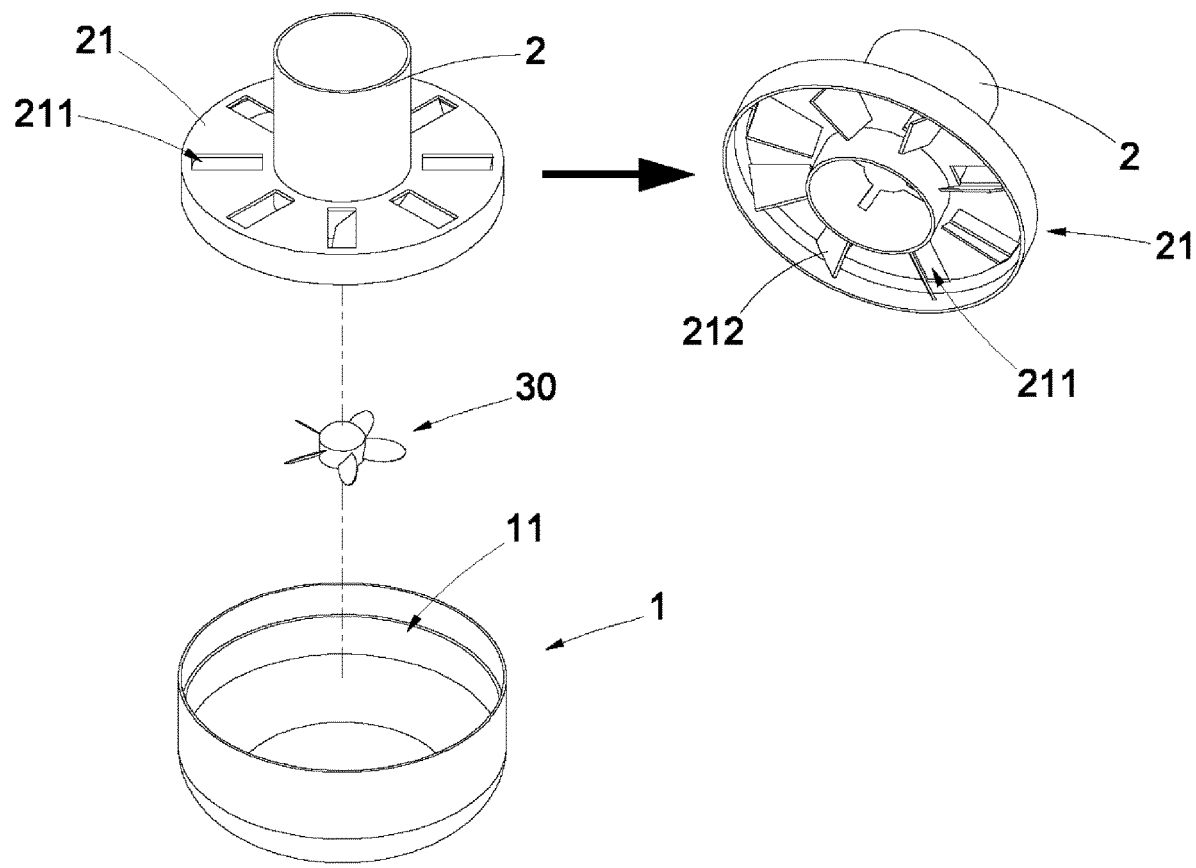
FIG. 1 is a perspective exploded view showing a swirl air/liquid air purifier according to the present invention.

1: Liquid accommodating disk
11: Liquid accommodating space
2: Air discharging pipe
20: Ultraviolet device
21: Bottom base
211: Air inlet hole
212: Inclined guiding plate/pipe
22: Temperature controlling air chamber
23: Temperature increasing/decreasing unit
231: Heating unit
232: Cooling unit
233: Air conditioning device
30: Air suction fan
33: Filtering screen
4: Plant
5: Liquid
6: Flowing air

DETAILED DESCRIPTION OF THE PREFERRED EMBODIMENT

One preferred embodiment of the present invention will be described with reference to the drawings for illustrating the structural assembly, the technical means and the functions to be achieved by the present invention; and the actual ratios and the arrangement of components shall not be limited by the ratios and the arrangement of components in the provided figures.

Figure 2:
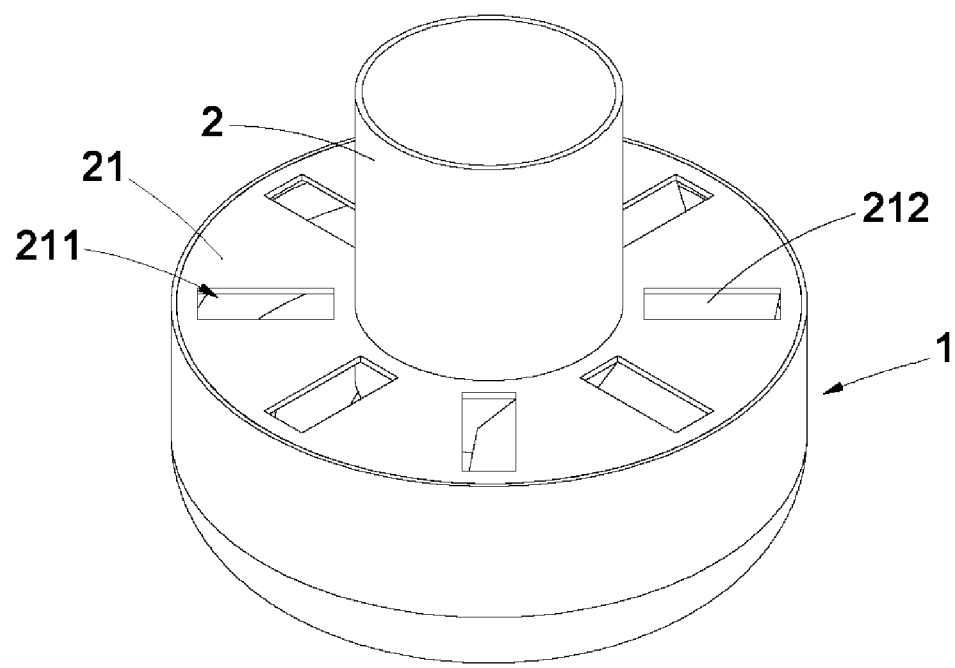
FIG. 2 is a perspective view showing the assembly of the swirl air/liquid air purifier according to the present invention.
Figure 3:
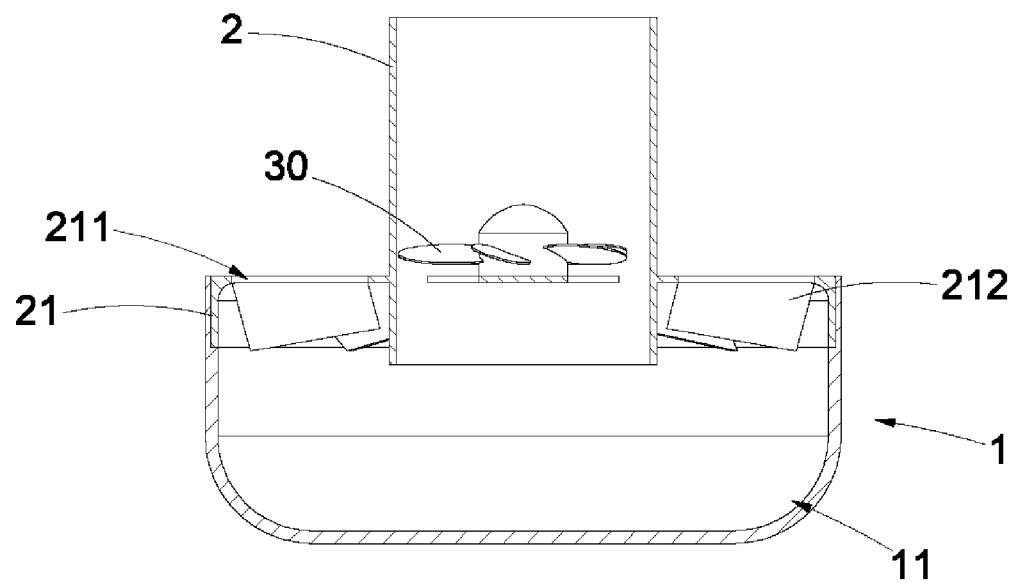
FIG. 3 is a cross sectional view showing the assembly of the swirl air/liquid air purifier according to the present invention.
Figure 4:
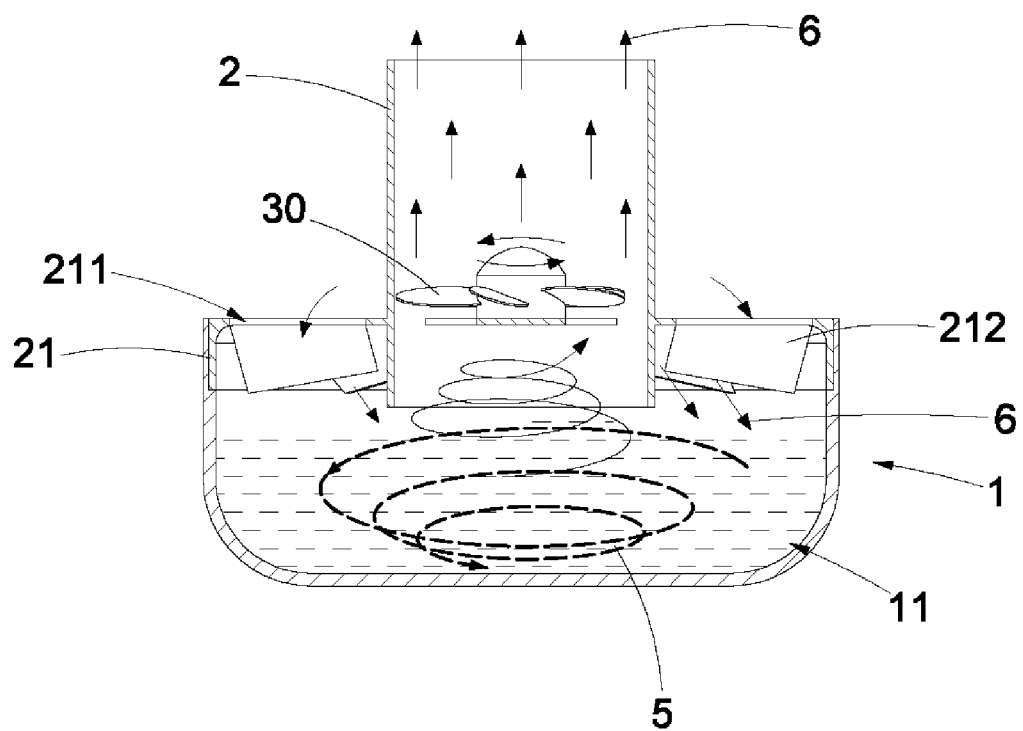
FIG. 4 is a schematic view showing the liquid being accommodated in the liquid accommodating disk of FIG. 3 and an action generated through the air suction fan, the bottom base, the air discharging pipe and the flowing air according to one embodiment of the present invention.
Figure 5:
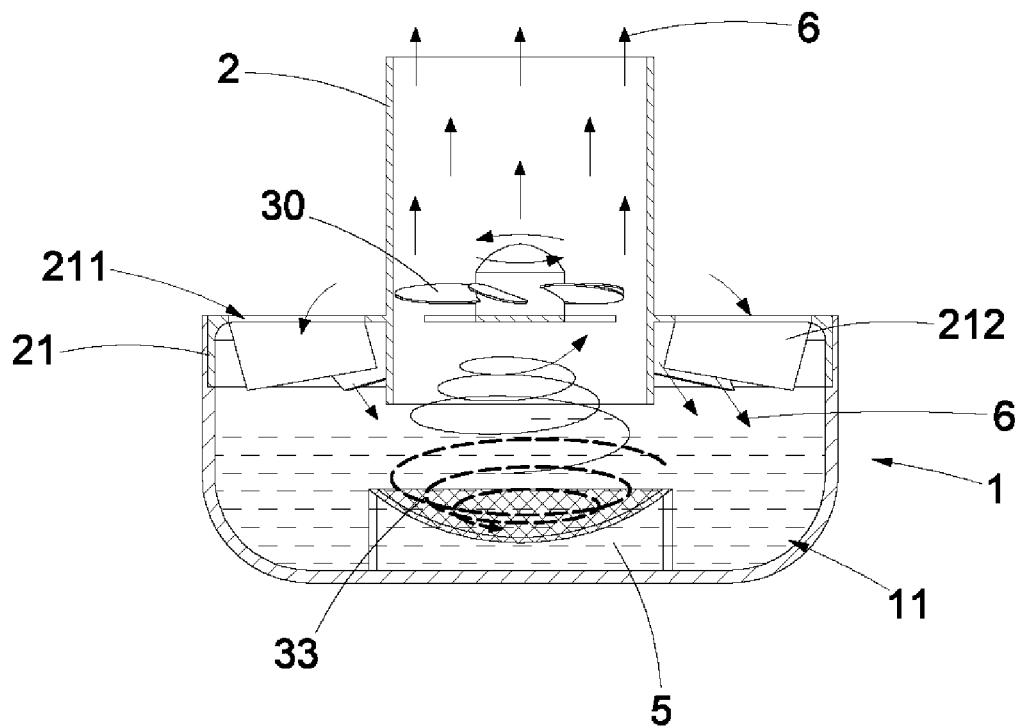
FIG. 5 is a schematic view showing the filtering screen being disposed in the liquid accommodating space of the liquid accommodating disk of FIG. 3, the liquid being accommodated in the liquid accommodating disk, and an action generated through the air suction fan, the bottom base, the air discharging pipe and the flowing air according to one embodiment of the present invention.
Figure 6:
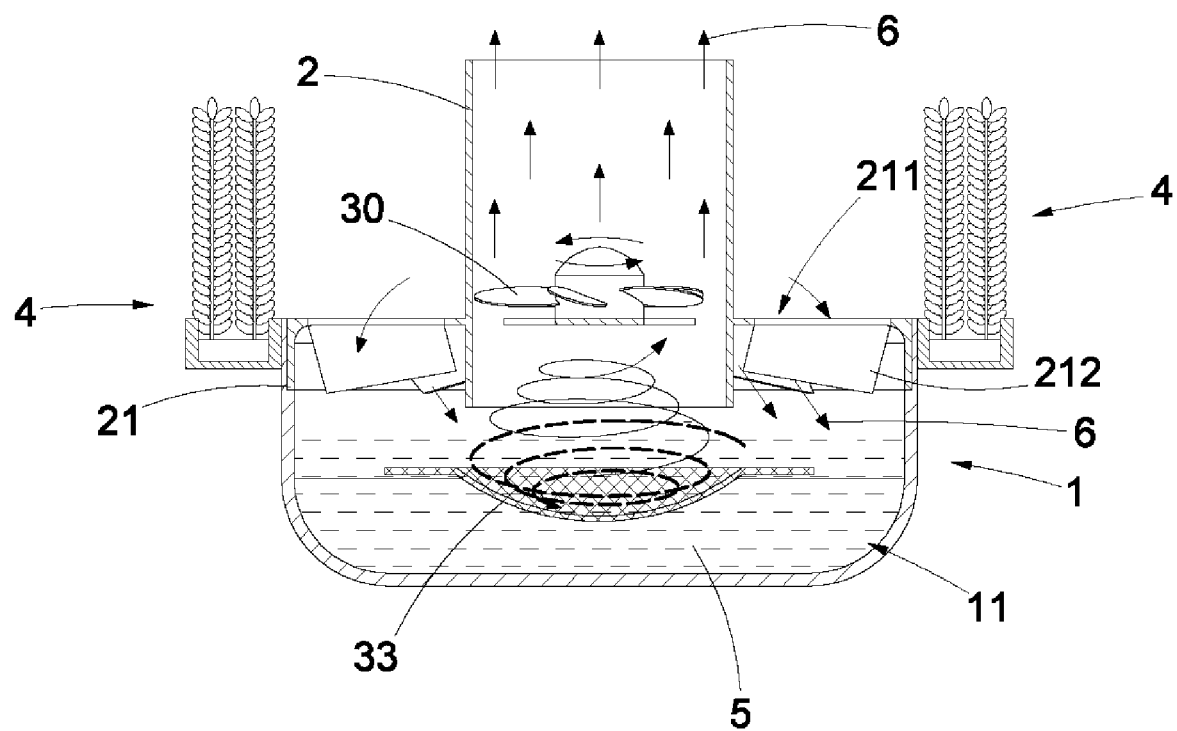
FIG. 6 is a schematic view showing the plant being disposed a location close to the hollow body upwardly extended from the air discharging pipe according to one embodiment of the present invention.
Figure 7:
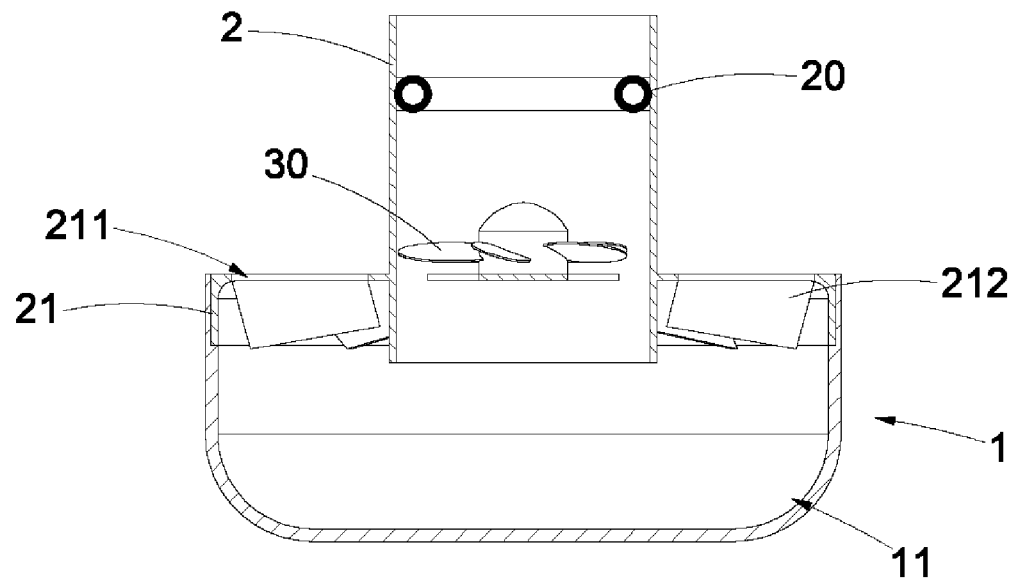
FIG. 7 is a schematic view showing the ultraviolet device being disposed in the air discharging pipe according to one embodiment of the present invention.
Figure 8:
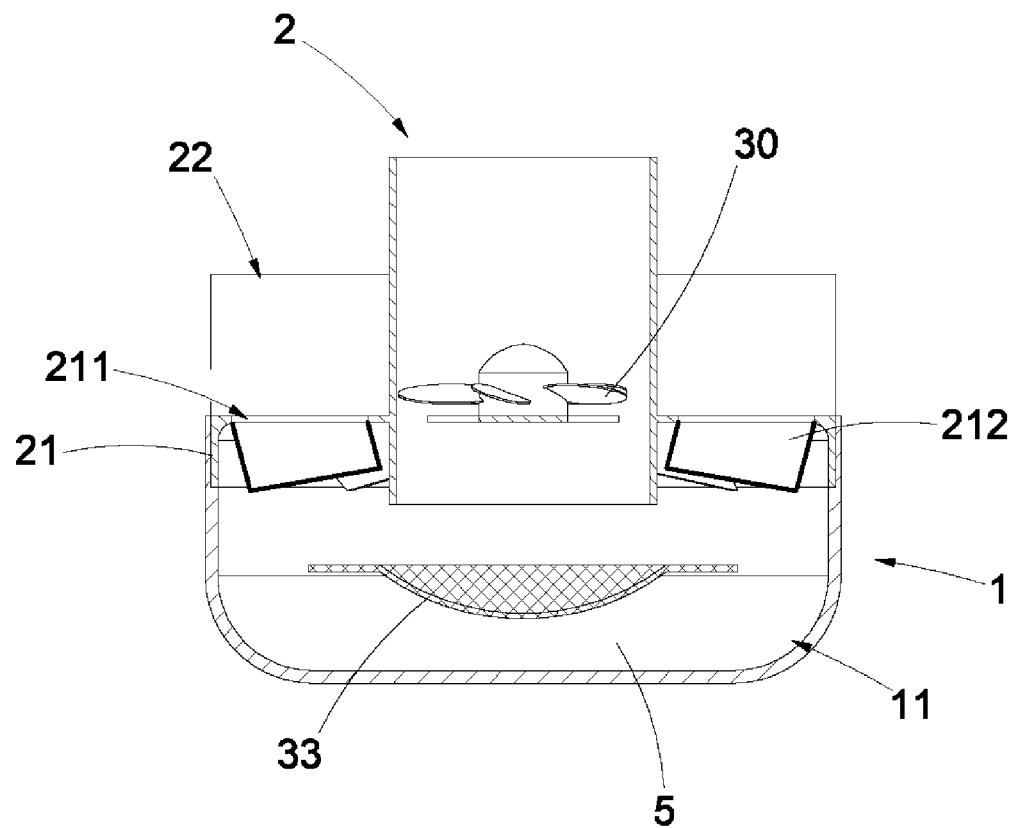
FIG. 8 is a schematic view showing the temperature controlling air chamber being disposed at a top end of the bottom base according to one embodiment of the present invention.
Figure 9:
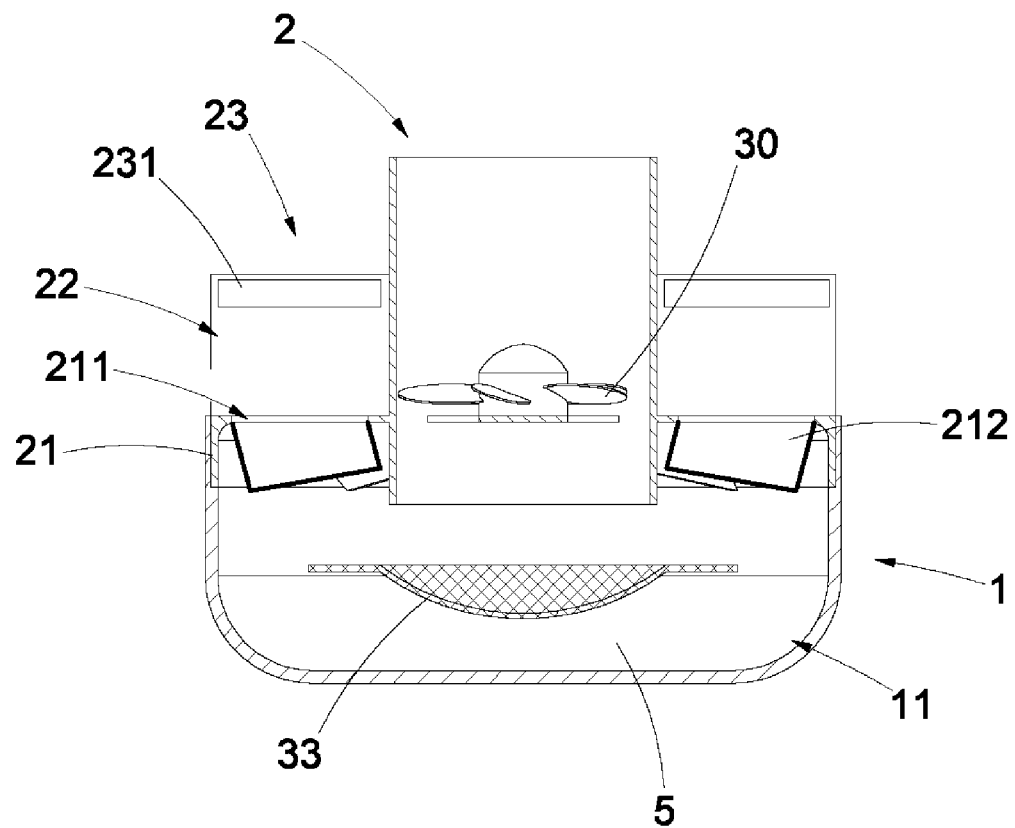
FIG. 9 is a schematic view showing the temperature increasing/decreasing unit of the temperature controlling air chamber being a heating unit according to one embodiment of the present invention.
Figure 10:
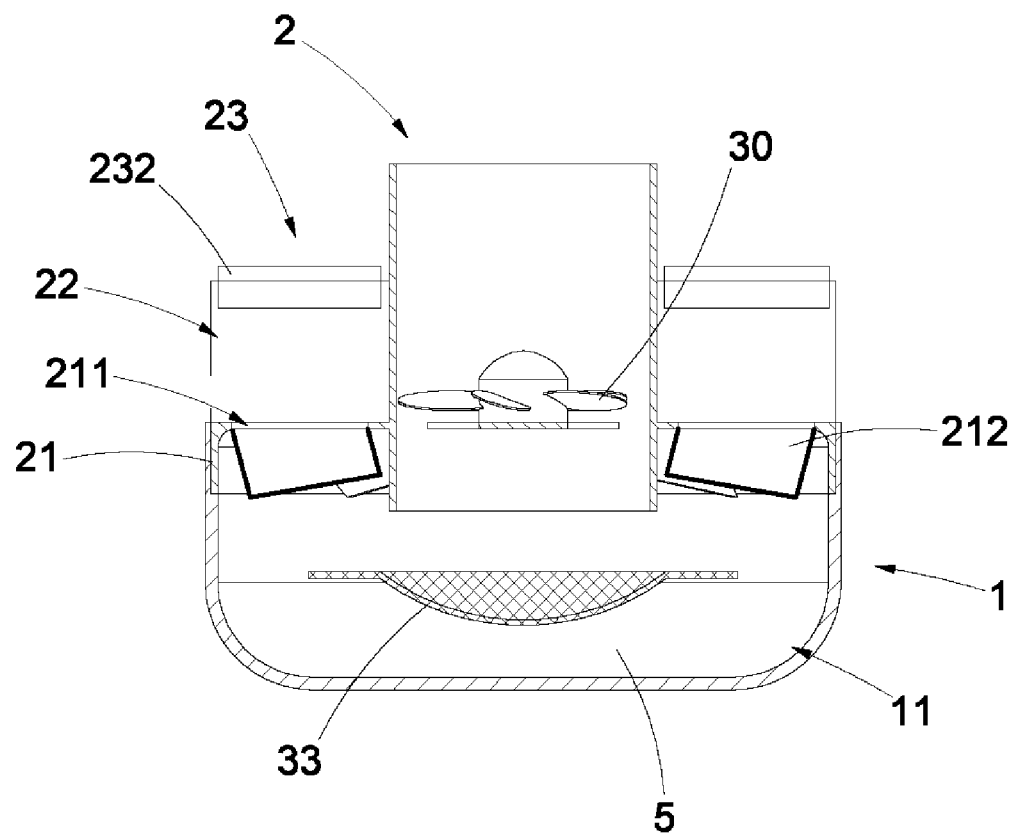
FIG. 10 is a schematic view showing the temperature increasing/decreasing unit of the temperature controlling air chamber being a cooling unit according to one embodiment of the present invention.
Figure 11:
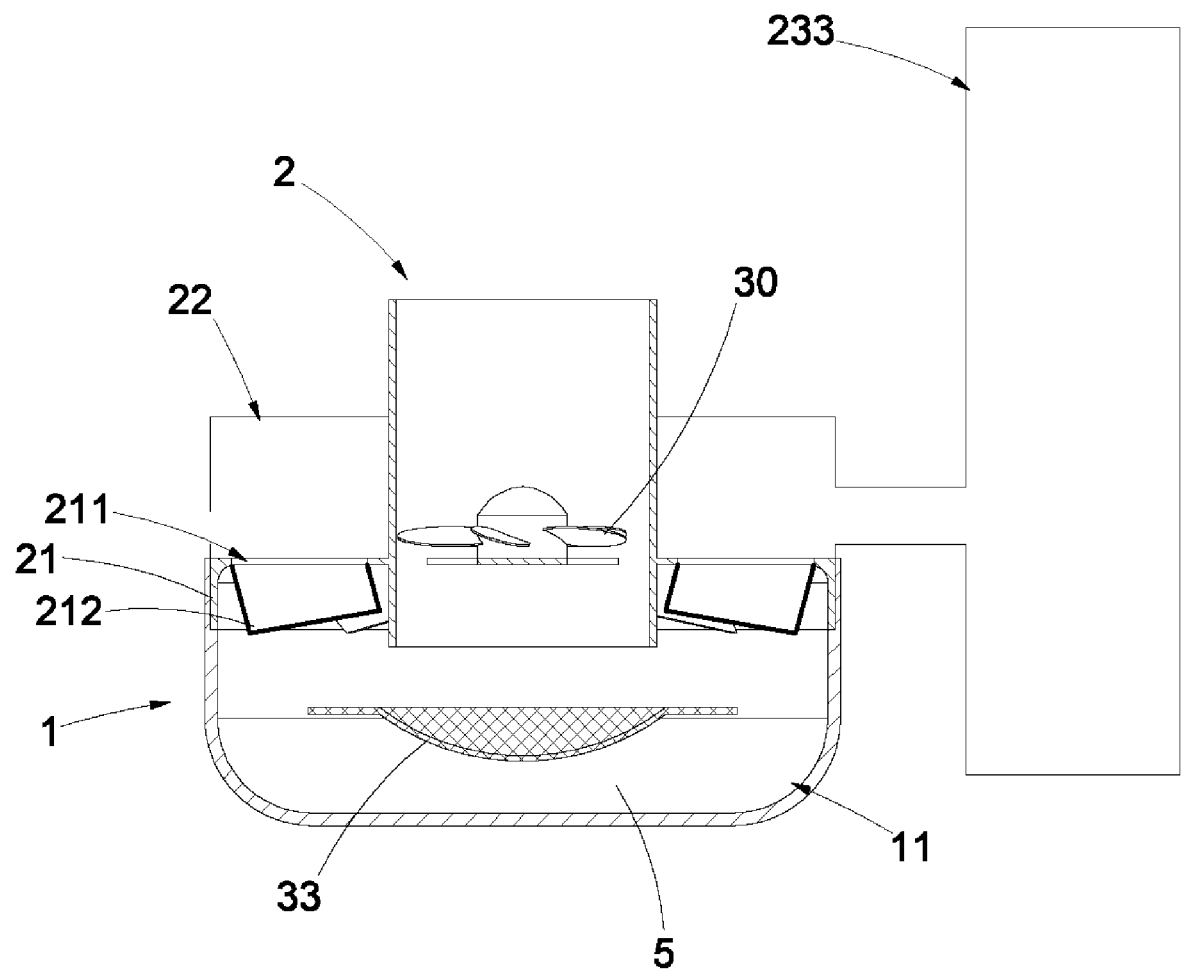
FIG. 11 is a schematic view showing the air conditioning device being externally connected to the temperature controlling air chamber for increasing/decreasing the temperature of the flowing air according to the present invention.
Figure 12:
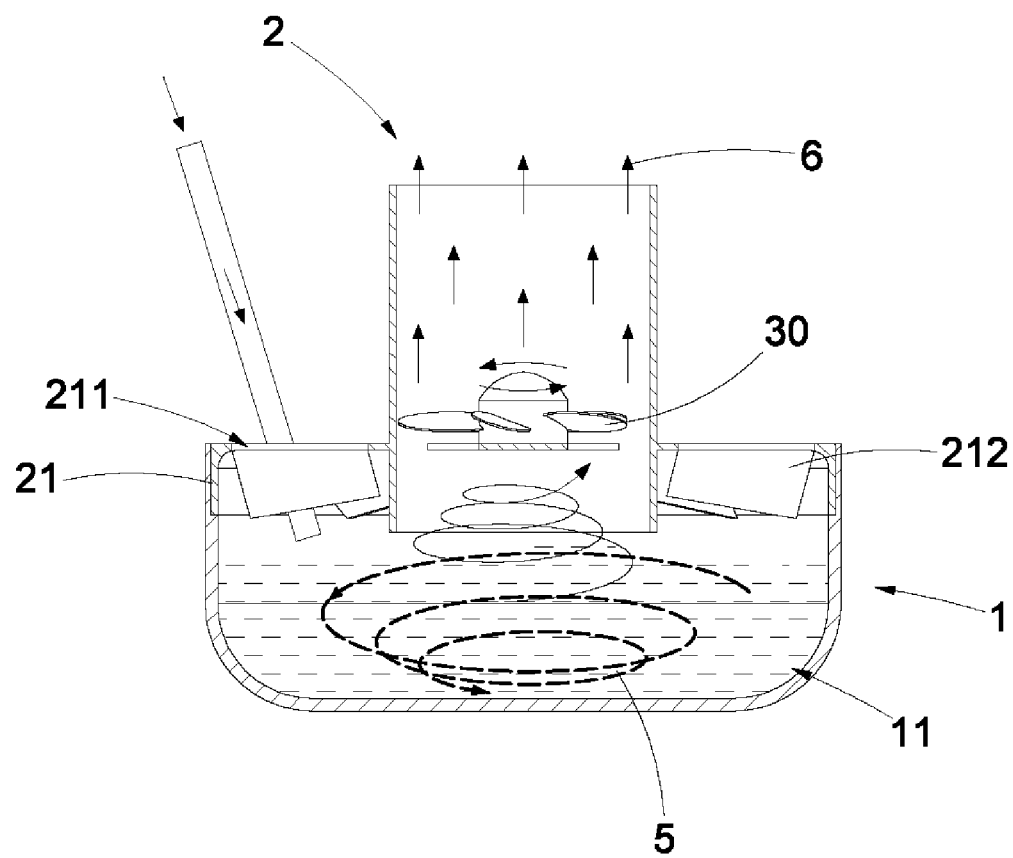
FIG. 12 is a schematic view showing the air inlet hole being disposed with the inclined guiding plate/pipe arranged on a surface of the liquid according to one embodiment of the present invention.
Figure 13:
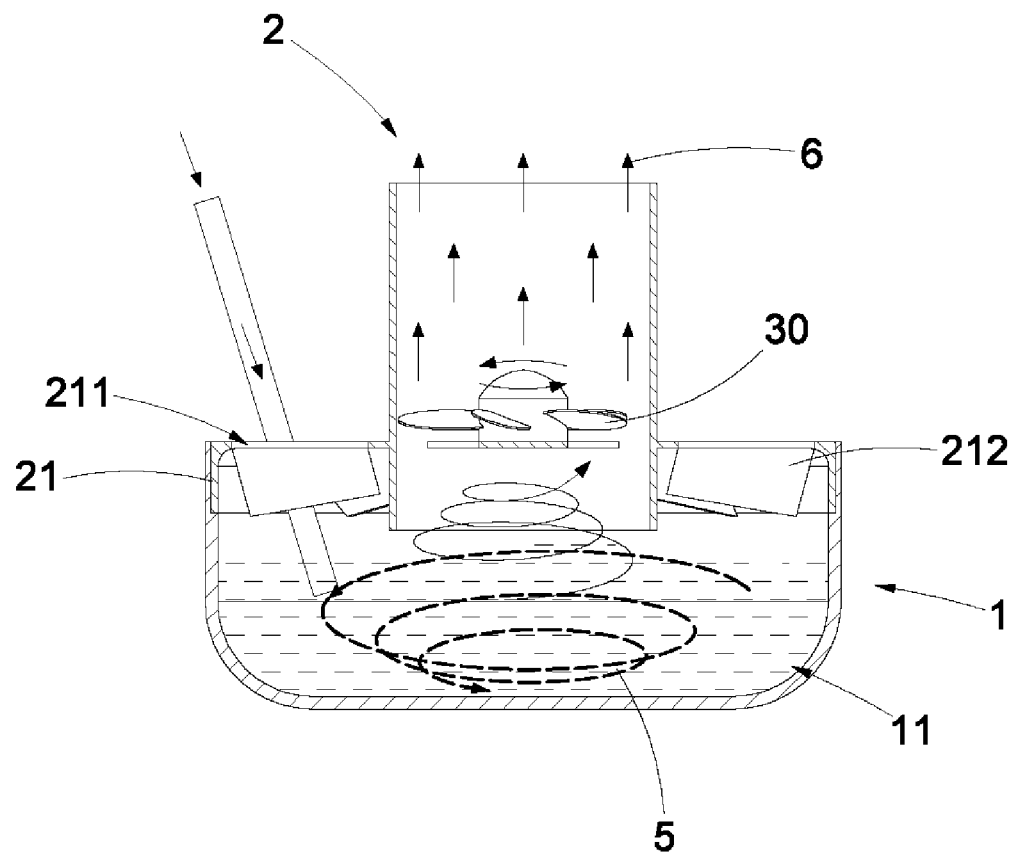
FIG. 13 is a schematic view showing the air inlet hole being disposed with the inclined guiding plate/pipe arranged in the liquid according to one embodiment of the present invention.
Figure 14:
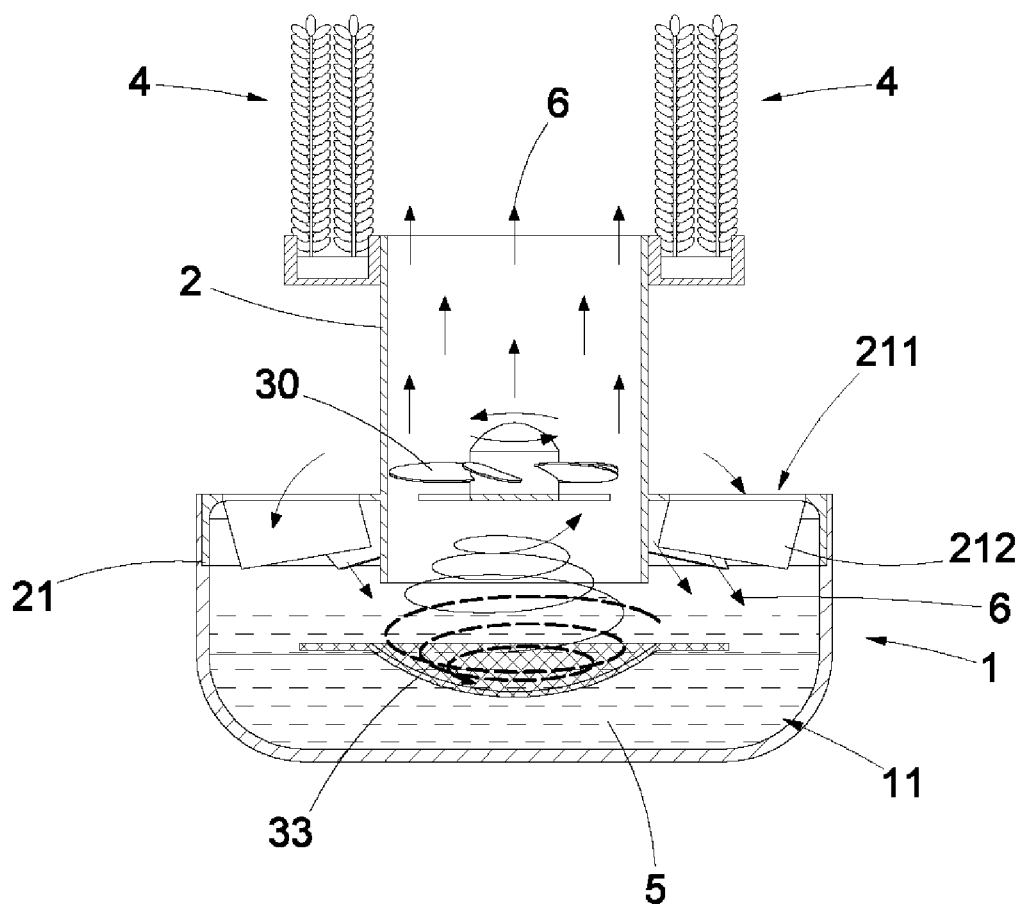
FIG. 14 is a schematic view showing the plant being disposed at a location close to the air inlet hole of the air discharging pipe according to one embodiment of the present invention.

Please refer from FIG. 1 to FIG. 14, wherein FIG. 1 is a perspective exploded view showing a swirl air/liquid air purifier according to the present invention; FIG. 2 is a perspective view showing the assembly of the swirl air/liquid air purifier according to the present invention; FIG. 3 is a cross sectional view showing the assembly of the swirl air/liquid air purifier according to the present invention; FIG. 4 is a schematic view showing the liquid being accommodated in the liquid accommodating disk of FIG. 3 and an action generated through the air suction fan, the bottom base, the air discharging pipe and the flowing air according to one embodiment of the present invention; FIG. 5 is a schematic view showing the filtering screen being disposed in the liquid accommodating space of the liquid accommodating disk of FIG. 3, the liquid being accommodated in the liquid accommodating disk, and an action generated through the air suction fan, the bottom base, the air discharging pipe and the flowing air according to one embodiment of the present invention; FIG. 6 is a schematic view showing the plant being disposed a location close to the hollow body upwardly extended from the air discharging pipe according to one embodiment of the present invention; FIG. 7 is a schematic view showing the ultraviolet device being disposed in the air discharging pipe according to one embodiment of the present invention; FIG. 8 is a schematic view showing the temperature controlling air chamber being disposed at a top end of the bottom base according to one embodiment of the present invention; FIG. 9 is a schematic view showing the temperature increasing/decreasing unit of the temperature controlling air chamber being a heating unit according to one embodiment of the present invention; FIG. 10 is a schematic view showing the temperature increasing/decreasing unit of the temperature controlling air chamber being a cooling unit according to one embodiment of the present invention; FIG. 11 is a schematic view showing the air conditioning device being externally connected to the temperature controlling air chamber for increasing/decreasing the temperature of the flowing air according to the present invention; FIG. 12 is a schematic view showing the air inlet hole being disposed with the inclined guiding plate/pipe arranged on a surface of the liquid according to one embodiment of the present invention; FIG. 13 is a schematic view showing the air inlet hole being disposed with the inclined guiding plate/pipe arranged in the liquid according to one embodiment of the present invention; and FIG. 14 is a schematic view showing the plant being disposed at a location close to the air inlet hole of the air discharging pipe according to one embodiment of the present invention. According to one preferred embodiment of the present invention, a swirl air/liquid air purifier characterized in comprising a liquid accommodating disk 1, an air discharging pipe 2 and an air suction fan 30 is disclosed.

The liquid accommodating disk 1 has a liquid accommodating space 11 formed in a recessed status for accommodating a liquid 5 (as shown from FIG. 1 to FIG. 11, FIG. 12 and FIG. 13).

The air discharging pipe 2 is disposed at a top end of the liquid accommodating disk 1 and upwardly extended so as to be formed as a hollow body, a bottom end thereof has a bottom base 21 which is sealed at the top end of the liquid accommodating disk 1, the bottom base 21 is formed with a plurality of air inlet holes 211 arranged adjacent to a periphery of the air discharging pipe 2, one side of the air inlet hole 211 is downwardly extended and obliquely inclined thereby forming an inclined guiding plate/pipe 212 allowing a swirl airflow to be generated (as shown from FIG. 1 to FIG. 11, FIG. 12 and FIG. 13, wherein FIG. 12 discloses a tubular member of the inclined guiding plate/pipe 212 being disposed on a surface of the liquid, FIG. 13 discloses the tubular member of the inclined guiding plate/pipe 212 being disposed in the liquid; at least one filtering screen 33 is disposed in the liquid accommodating space 11 of the liquid accommodating disk 1; according to this embodiment, the filtering screen 33 is formed in a downwardly concave arc-shape (as shown in FIG. 5), but what shall be addressed is that the scope of the present invention is not limited to the above-mentioned arrangement, and at least one ultraviolet device 20 (as shown in FIG. 7) used for killing germs is disposed in the air discharging pipe 2.

The air suction fan 30 is disposed in the air discharging pipe 2 formed as the hollow body (as shown from FIG. 1 to FIG. 4, FIG. 5, FIG. 6 to FIG. 11, FIG. 12 and FIG. 13).

According to the present invention, at least one plant 4 (as shown in FIG. 6) is disposed a location close to the hollow body upwardly extended from the air discharging pipe 2; or according to the present invention, at least one plant 4 (as shown in FIG. 14) is disposed at a location close to the air inlet hole 211 of the air discharging pipe 2.

When the present invention is in use, the air suction fan 30 is firstly actuated, and the air inlet hole 211 having the inclined guiding plate/pipe 212 and formed on the bottom base 21 is utilized for introducing flowing air 6 to generate a swirl airflow blowing towards the surface of the liquid 5 or blowing into the liquid 5, so that a swirl liquid flow can be generated through the swirl airflow being applied to the liquid 5 accommodated in the liquid accommodating disk 1 due to frictions, and a surface tension of the liquid 5 is broken for increasing a capability of the surface of the liquid 5 absorbing impurities such as dusts or liquid particles in the flowing air 6, with the absorbing force of the liquid 5 for absorbing the impurities such as the dusts or the liquid particles, the impurities such as the dusts or the liquid particles in the flowing air 6 are able to be absorbed via the liquid 5 accommodated in the liquid accommodating disk 1, thereby allowing the impurities such as the dusts or the liquid particles to be absorbed in the liquid 5 accommodated in the liquid accommodating disk 1, the swirl airflow enables the liquid 5 accommodated in the liquid accommodating space 11 to generate the swirl liquid flow; as such, the impurities such as the dusts or the liquid particles are absorbed in the liquid 5 accommodated in the liquid accommodating disk 1, then the purified flowing air 6 is able to be discharged through the air suction fan 30 and the air discharging pipe 2 so as to enter an opened space, thereby achieving an objective of purifying the flowing air 6 (as shown in FIG. 4); the impurities such as the dusts or the liquid particles are further collected and gathered in the filtering screen 33 disposed in the liquid accommodating space 11 (as shown in FIG. 5), and oxygen generated by the plant 4 arranged close the bottom base 21 can be blown out at the same time (as shown in FIG. 6); accordingly, the present invention can be served as an ornament, with the above-mentioned structure of the present invention, an air filtering net required in most of conventional air purifiers is not needed, thus an objective of being environmental friendly can also be provided.

Please refer from FIG. 8 to FIG. 11, for controlling a temperature of the flowing air 6, a temperature controlling air chamber 22 (as shown in FIG. 8) is disposed at a top end of the bottom base 21, at least one temperature increasing/decreasing unit 23 (as shown from FIG. 9 to FIG. 11) used for increasing/decreasing the temperature of the flowing air 6 is disposed in the temperature controlling air chamber 22 for increasing/decreasing the temperature, when the flowing air 6 is desired to be heated, the temperature increasing/decreasing unit 23 is a heating unit 231 (as shown in FIG. 9), when the flowing air 6 is desired to be cooled, the temperature increasing/decreasing unit 23 is a cooling unit 232 (as shown in FIG. 10); according to this embodiment, the cooling unit 232 is a semi-conductor cooling unit, but what shall be addressed is that the scope of the present invention is not limited to the above-mentioned arrangement; moreover, according to the present invention, an air conditioning device 233 is externally connected to the temperature controlling air chamber 22 at the top end of the bottom base 21; according to this embodiment, the air conditioning device 233 is disposed at an outer side of the liquid accommodating disk 1 for increasing/decreasing the temperature of the flowing air 6 (as shown in FIG. 11).

According to the present invention, the air discharging pipe 2 is disposed at the top end of the liquid accommodating disk 1 and the bottom base 21 is disposed at the bottom end of the air discharging pipe 2, the bottom base 21 is formed with the air inlet hole 211 and has the inclined guiding plate/pipe 212, and the air suction fan 30 is disposed in the air discharging pipe 2; as such, the bottom base 21 formed with the air inlet hole 211 and having the inclined guiding plate/pipe 212 can enable the flowing air 6 to generate the swirl airflow, so that the swirl liquid flow can be generated through the liquid 5 accommodated in the liquid accommodating disk 1, and the impurities such as the dusts or the liquid particles in the flowing air 6 can be absorbed in the liquid 5, thereby achieving the objective of purifying air, then, the purified flowing air 6 is able to be discharged through the air suction fan 30 and the air discharging pipe 2 so as to enter the opened space; accordingly, the present invention has advantages of effectively purifying air and having functions of being applied in various purposes; accordingly, the present invention is novel, more practical in use and capable of satisfying requirements of consumers comparing to prior arts.

Based on what has been disclosed above, the present invention is novel comparing to prior arts, and achieves effects which are desired to be achieved, and the feature of the present invention is easy to be invented by the skilled people in the arts, moreover, the feature of the present invention has not been published and complies with the patentability of novelty, practicability and non-obviousness. As such, the present invention is applied with a hope of being granted so as to contribute to the relative technical fields.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A swirl air/liquid air purifier, characterized in comprising:
    a liquid accommodating disk, having a liquid accommodating space formed in a recessed status for accommodating a liquid;
    an air discharging pipe, disposed at a top end of the liquid accommodating disk and upwardly extended so as to be formed as a hollow body, wherein a bottom end thereof has a bottom base which is sealed at the top end of the liquid accommodating disk, the bottom base is formed with a plurality of air inlet holes arranged adjacent to a periphery of the air discharging pipe, all of the plurality of air inlet holes include one side that is downwardly extended and obliquely inclined thereby forming an inclined guiding plate allowing a swirl airflow to be generated; and
    an air suction fan, disposed in the air discharging pipe;
    wherein, the air suction fan is utilized for sucking air, the air inlet hole having the inclined guiding plate and formed on the bottom base is utilized for introducing flowing air to generate a swirl airflow blowing towards a surface of the liquid or blowing into the liquid, so that a swirl liquid flow is able to be generated through the swirl airflow being applied to the liquid accommodated in the liquid accommodating disk due to frictions, and a surface tension of the liquid is broken for increasing a capability of the surface of the liquid absorbing impurities such as dusts or liquid particles in the flowing air, with the absorbing force of the liquid for absorbing the impurities such as the dusts or the liquid particles, the impurities such as the dusts or the liquid particles in the flowing air are able to be absorbed via the liquid accommodated in the liquid accommodating disk, then the purified flowing air is able to be discharged through the air suction fan and the air discharging pipe so as to enter an opened space, thereby achieving an objective of purifying the flowing air.

2. The swirl air/liquid air purifier as claimed in claim 1, wherein at least one filtering screen is disposed in the liquid accommodating space of the liquid accommodating disk.

3. The swirl air/liquid air purifier as claimed in claim 2, wherein the filtering screen is formed in a downwardly concave arc-shape.

4. The swirl air/liquid air purifier as claimed in claim 1, wherein at least one ultraviolet device used for killing germs is disposed in the air discharging pipe.

5. The swirl air/liquid air purifier as claimed in claim 1, wherein a temperature controlling air chamber is disposed at a top end of the bottom base.

6. The swirl air/liquid air purifier as claimed in claim 5, wherein at least one temperature increasing/decreasing unit used for increasing/decreasing a temperature of the flowing air is disposed in the temperature controlling air chamber.

7. The swirl air/liquid air purifier as claimed in claim 6, wherein the temperature increasing/decreasing unit of the temperature controlling air chamber is a heating unit or a cooling unit.

8. The swirl air/liquid air purifier as claimed in claim 5, wherein an air conditioning device used for increasing/decreasing a temperature of the flowing air is externally connected to the temperature controlling air chamber.

* * * * *